United States Patent [19]
Newport et al.

[11] Patent Number: 5,809,833
[45] Date of Patent: Sep. 22, 1998

[54] LINEAR ACTUATOR

[75] Inventors: Samuel O. Newport, Beloit, Wis.;
Charles H. Thompson, Stillman Valley, Ill.

[73] Assignee: Dana Corporation, Toledo, Ohio

[21] Appl. No.: 718,878

[22] Filed: Sep. 24, 1996

[51] Int. Cl.[6] .................................................. F16H 25/20
[52] U.S. Cl. ................................. 74/89.15; 74/424.8 R; 192/141
[58] Field of Search ............................. 192/141, 142 R, 192/143; 74/89.15, 424.8 R

[56] References Cited

U.S. PATENT DOCUMENTS

| | | |
|---|---|---|
| 3,951,004 | 4/1976 | Heesch . |
| 4,241,814 | 12/1980 | Masclet . |
| 4,318,304 | 3/1982 | Lang ...................................... 74/89.15 |
| 4,602,520 | 7/1986 | Nishikawa et al. . |
| 4,669,325 | 6/1987 | Nishikawa et al. . |
| 4,679,457 | 7/1987 | Nishikawa et al. . |
| 4,790,201 | 12/1988 | Gheddo . |
| 4,858,481 | 8/1989 | Abraham ................................ 74/89.15 |
| 5,090,513 | 2/1992 | Bussinger ........................... 74/89.15 X |
| 5,388,471 | 2/1995 | DeCampos et al. ........... 74/424.8 R X |
| 5,461,935 | 10/1995 | Hill ..................................... 74/89.15 X |
| 5,620,078 | 4/1997 | Nakamura et al. ................. 192/142 R |
| 5,655,636 | 8/1997 | Lang et al. ......................... 74/89.15 X |

*Primary Examiner*—Charles A. Marmor
*Assistant Examiner*—Saúl J. Rodriguez
*Attorney, Agent, or Firm*—MacMillan, Sobanski & Todd, LLC

[57] ABSTRACT

A linear actuator includes a motor having a rotatable output shaft, a lead screw having a worm gear thread, a forward end and a rear end, a worm gear drive train connected between the motor output shaft and the lead screw to convert the rotary motion of the motor output shaft into rotary motion of the lead screw, an extension tube assembly mounted at the forward end of the lead screw, where the extension tube assembly includes an extension tube concentrically disposed around the forward end of the lead screw, the extension tube having a forward end for contacting a device requiring linear motion, and a rear end, a nut connected to the rear end of the extension tube and threadedly mounted on the lead screw so that rotation of the lead screw moves the nut and the extension tube assembly axially along the lead screw, and a mounting adapter positioned at the rear end of the lead screw for rotatably mounting the lead screw and for attaching the linear actuator to a support structure.

20 Claims, 5 Drawing Sheets

LINEAR ACTUATOR

BACKGROUND OF THE INVENTION

This invention relates in general to linear actuators and in particular to an improved structure for a linear actuator which is relatively lightweight and inexpensive in construction, yet which is capable of handling relatively heavy loads.

A linear actuator is a device which is used to cause linear movement, typically reciprocating linear movement, of a workpiece along a desired path of movement. A typical linear actuator includes an electric motor having a rotatable output shaft. The output shaft of the electric motor is connected through a gear train to a nut and lead screw mechanism. Rotation of the output shaft of the electric motor causes corresponding rotation of the lead screw. The nut has an opening formed therethrough having an internal thread. The lead screw extends through the opening and has an external thread formed which cooperates with the internal thread formed on the nut. The nut is mounted on the lead screw in such a manner as to be restrained from rotating with the lead screw when the lead screw rotates. As a result, rotation of the lead screw causes linear movement of the nut axially along the lead screw. The direction of such axial movement of the nut (and the workpiece connected thereto) is dependent upon the direction of rotation of the lead screw.

Linear actuators are widely used in a variety of applications ranging from small to heavy loads. To accommodate heavy loads, known linear actuator structures have been formed from relatively large and heavy metallic components. Consequently, linear actuator structures currently in use are relatively heavy and expensive. Thus, it would be desirable to provide an improved linear actuator structure which is relatively lightweight and inexpensive to produce, and yet which is capable of handling heavy loads.

SUMMARY OF THE INVENTION

The above object as well as other objects not specifically enumerated are achieved by an improved structure for a linear actuator in which the rotary motion from a motor is converted to rotary motion of a lead screw by use of a worm gear drive train. In turn, the rotary motion of the lead screw is converted to linear motion of an extension tube by use of a nut which is threadedly mounted on the lead screw. The linear actuator includes a motor having a rotatable output shaft, and the lead screw has a forward end and a rear end. A worm gear drive train connected between the motor output shaft and the lead screw converts the rotary motion of the motor output shaft into rotary motion of the lead screw. An extension tube assembly is mounted at the forward end of the lead screw for movement axially of the lead screw and for engaging the workpiece or device to be moved linearly. The extension tube assembly includes an extension tube concentrically disposed around the forward end of the lead screw. The extension tube has a forward end for contacting a device requiring linear motion, and a rear end. A nut is connected to the rear end of the extension tube and is threadedly mounted on the lead screw so that rotation of the lead screw moves the nut and the extension tube assembly axially along the lead screw. A mounting adapter is positioned at the rear end of the lead screw for rotatably mounting the lead screw. The mounting adapter also attaches the linear actuator to the support structure, such as a frame or machine.

The linear actuator preferably includes a housing to cover the linear actuator for protection from dirt and for maintaining lubrication. The housing is mounted on the mounting adapter, and substantially all of the axial forces along the lead screw are transmitted through the mounting adapter and not through the housing. All the large axial and radial forces are transmitted through and applied to the lead screw, the extension tube assembly, and the mounting adapter. Therefore, the housing which encloses the linear actuator can be made from a lightweight material, such as plastic.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figures 1, 2:
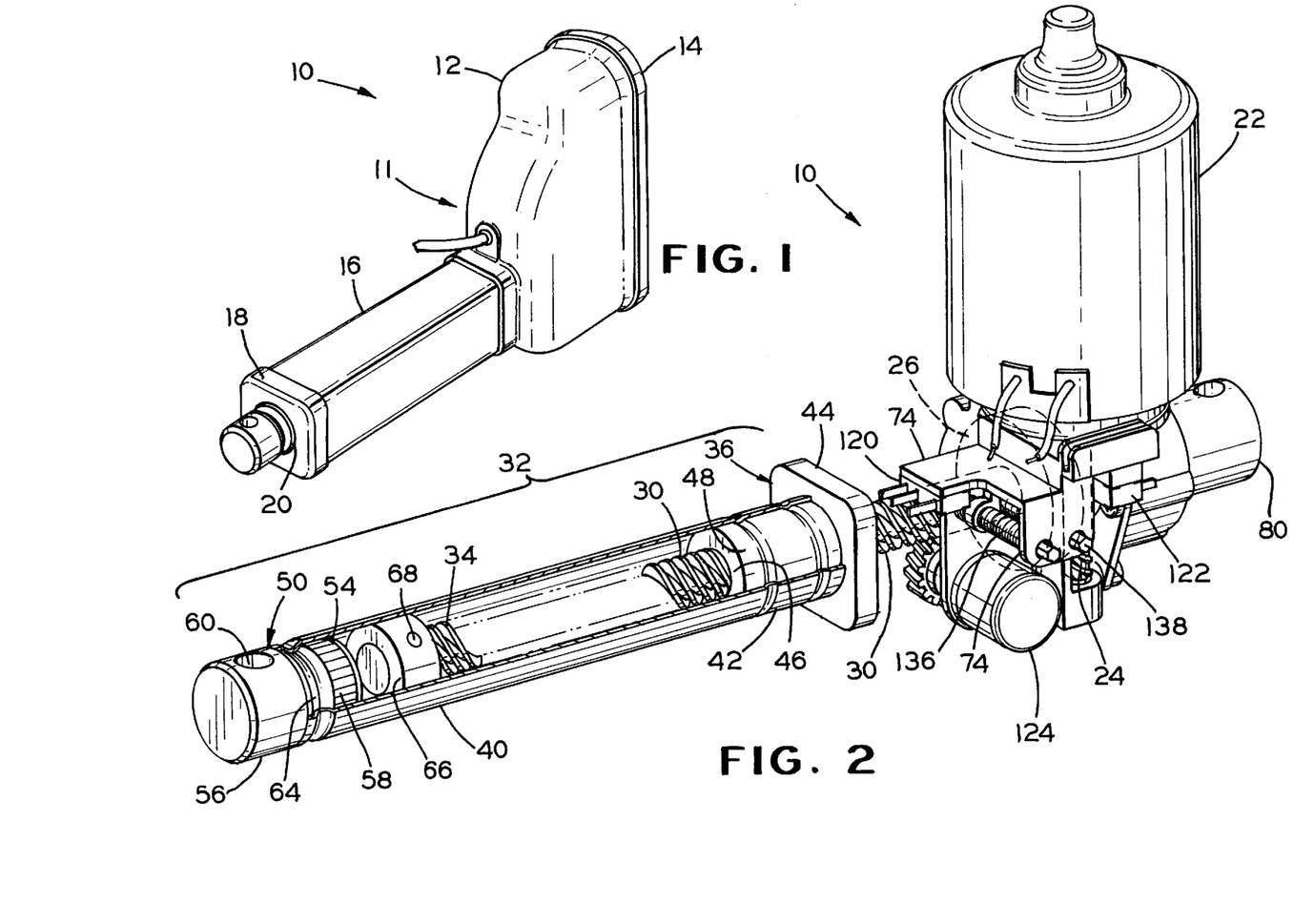
FIG. 1 is a perspective view of the exterior of a linear actuator in accordance with this invention.
FIG. 2 is a perspective view of the interior of the linear actuator illustrated in FIG. 1, wherein the various external housing components have been removed for clarity.

Referring now to the drawings, there is illustrated in FIGS. 1 and 2 a linear actuator, indicated generally at 10, in accordance with this invention. The illustrated linear actuator 10 includes a hollow housing 11 for protectively enclosing most of the components thereof to prevent the entry of dirt, water, and other contaminants from the environment. The housing 11 includes a main housing portion 12. A rear panel 14 is connected to the rear open end of the main housing portion 12, while an elongated hollow cover tube 16 extends forwardly from a forward opening formed through the main housing portion 12.

The forward end of the cover tube 16 is closed by an end cap 18. The end cap 18 has an opening 20 formed therethrough, for a purpose which will be described below. Thus, the housing 12, the rear panel 14, the cover tube 16, and the end cap 18 cooperate as shown in FIG. 1 to provide a protective enclosure for the linear actuator 10. The main housing portion, the rear panel, the cover tube, and the end cap are preferably formed from a relatively lightweight, rigid material. For example, these components may be formed from glass-filled nylon, aluminum, zinc, aluminum/zinc alloys, stainless steel, polyvinyl chloride, high or low density polyethylene.

As shown in FIG. 2, the linear actuator 10 includes a source of rotational power, such as an electric motor 22 having a rotatable output shaft or worm gear drive shaft 24. The motor 22 can be of any type depending on the type of application in which the linear actuator 10 is to be used. In a preferred embodiment of a linear actuator to be used in a light load application, the electrical motor may be a 12 volt or 24 volt direct current, reversible motor. For longer life applications, the motor may be a 115 volt or 230 volt alternating current, reversible motor.

The output shaft 24 of the electric motor 22 is formed having an integral external helical thread. The output shaft of the motor is connected to a worm gear drive train 26. The worm gear drive train 26 connects the output shaft 24 to the lead screw 30, thereby causing the lead screw to be rotated at a desired speed. The speed at which the lead screw is rotated can be varied by changing the gear ratio in the worm gear drive train 26. However, in a preferred embodiment, a single gear ratio is used and the speed at which the lead screw is rotated is varied by using interchangeable lead screws having different pitches.

The rotational motion of the lead screw 30 is converted into linear motion by means of an extension tube assembly 32. The extension tube assembly 32 is mounted on the forward end 34 of the lead screw 30 for reciprocal or axial movement with respect to the lead screw. The extension tube assembly 32 is comprised of a nut 36 which is threaded and mounted on the lead screw, and an extension tube 40 concentrically disposed around the forward end 34 of the lead screw. The nut 36 is positioned at the rear end 42 of the extension tube, and is prevented from rotating with the lead screw because the nut has a square-shaped nut head 44, and the cover tube 16 is square-shaped so that it fits tightly around the nut head 44 to prevent the nut from rotating with the lead screw. Instead of rotating, the nut moves axially along the lead screw so as to be extended from the cover tube 16 or retracted into the cover tube 16. An alternative way to prevent the rotation of the nut 36 is to use other shapes for the nut head 44 and the cover tube, including any generally rectangular shape. Also, the nut can be fixed to the cover tube with some device, such as a ball bearing screw, which allows a single range of movement for the nut, which is to move axially along a screw. The nut also includes front face 46 on cylindrical body 48. The nut can be constructed from a variety of plastic or metal materials including, but not limited to, nylon, acetal resin (polyacetals), bronze, and steel. In a preferred embodiment, the nut is made from nylon. In the embodiment shown, the lead screw 30 is of involute form (i.e. having inwardly curved threads) and functions as a worm form of gearing that engages with mating threads on the nut 36 to produce linear motion. The lead screw is preferably made from steel, but can be made from other suitable materials including, but not limited to, aluminum.

The nut 36 is connected to the generally cylindrically-shaped extension tube 40 by fastening the extension tube to the cylindrical body 48 of the nut in some fashion. In a preferred embodiment, the extension tube is made from a deformable, usually metallic, material such as steel tubing which allows the extension tube to be crimped around the cylindrical body 48 of the nut. At the forward end 50 of the extension tube is a front stop 54 and a front adapter 56. The front adapter 56 is a cylindrically-shaped plug having a knurled surface 58 at one end and a bore 60 which extends perpendicularly through the front adapter 56 at the opposite end. A grooved or necked portion 64 is located between the knurled surface 58 and the bore 60. The bore is used for attaching or connecting the workpiece or device, not shown, requiring the linear motion, to the linear actuator 10. Typically, a lockable pin, not shown, is inserted through the bore to attach the front of the adapter 56 to the device requiring the linear motion. Preferably the diameter of the bore is within the range of from about 0.25 to about 0.50 inches to accommodate the many devices that can be moved or actuated using the linear actuator of the invention. In a preferred embodiment, the bore diameter is within the range of from about 0.25 to about 0.375 inches. The front adapter 56 can be made from a variety of materials including, but not limited to, steel, aluminum, zinc, or alloys thereof. In a preferred embodiment, the front adapter is made from die-cast zinc. The front adapter is fixed in place within the extension tube 40 by crimping the extension tube around the front adapter in the grooved portion 64 and on the knurled surface 58 of the front adapter.

On the forward end 34 of the lead screw 30 is an end stop 66. The end stop is an annular element which is mounted on the lead screw by mating threads, and it is fixed in position with a cross pin 68. The cross pin is inserted into aligned bores, not shown, in both the end stop and the lead screw. The end stop 66 is sized to fit closely within the extension tube 40 so that it supports the lead screw 30 at its forward end 34. Preferably, the end stop 66 is made from a material having a low coefficient of friction such as nylon.

The front stop 54, mounted on the front adapter 56, is used to provide a physical hard stop with low friction for the extension tube assembly 32 when the extension tube assembly is fully retracted into the cover tube 16, at which point the front stop abuts the end stop 66 mounted on the lead screw 30. The front stop 54 is a relatively thin disk which abuts the end of the front adapter 56 having the knurled surface 58. The front stop 54 may be secured to the front adapter 56 using any of the known devices including, but not limited to, adhesive, rivets, and screws. Preferably, the front stop 54 is made from a material having a low coefficient of friction such as nylon.

As described above, the extension tube assembly 32 is able to move axially along the lead screw 30 in both a forward or extend direction, wherein the extension tube assembly 30 moves away from the motor 22, and in a rearward or retract direction wherein the extension tube assembly moves towards the motor and the rearward end of the actuator 10. Axial movement in the extend direction is stopped when the front face 46 of the nut 36 abuts the end stop 66 mounted on the lead screw 30. Conversely, the axial movement of the extension tube assembly 32 in the retract direction is stopped when the front adapter 56 abuts the end stop 66. In a preferred embodiment of this invention, the front face 46 of the nut, the front stop 54, and the end stop 66 are all made from a material having a low coefficient of friction, such as nylon. The use of a material having a low coefficient of friction for these components is desirable so as to allow the lead screw 30 to reverse its rotation under high axial loads when the extension tube is at the end of either its extend or retract stroke. In the alternative, other low friction materials could be used including, but not limited to, acetal resins (polyacetals) or bronze. The total amount of axial movement or stroke length provided by the extension tube assembly 32 can be designed in varying lengths. In general, the stroke length of the extension tube assembly is usually within the range of from about one to about thirty inches.

Figure 3:
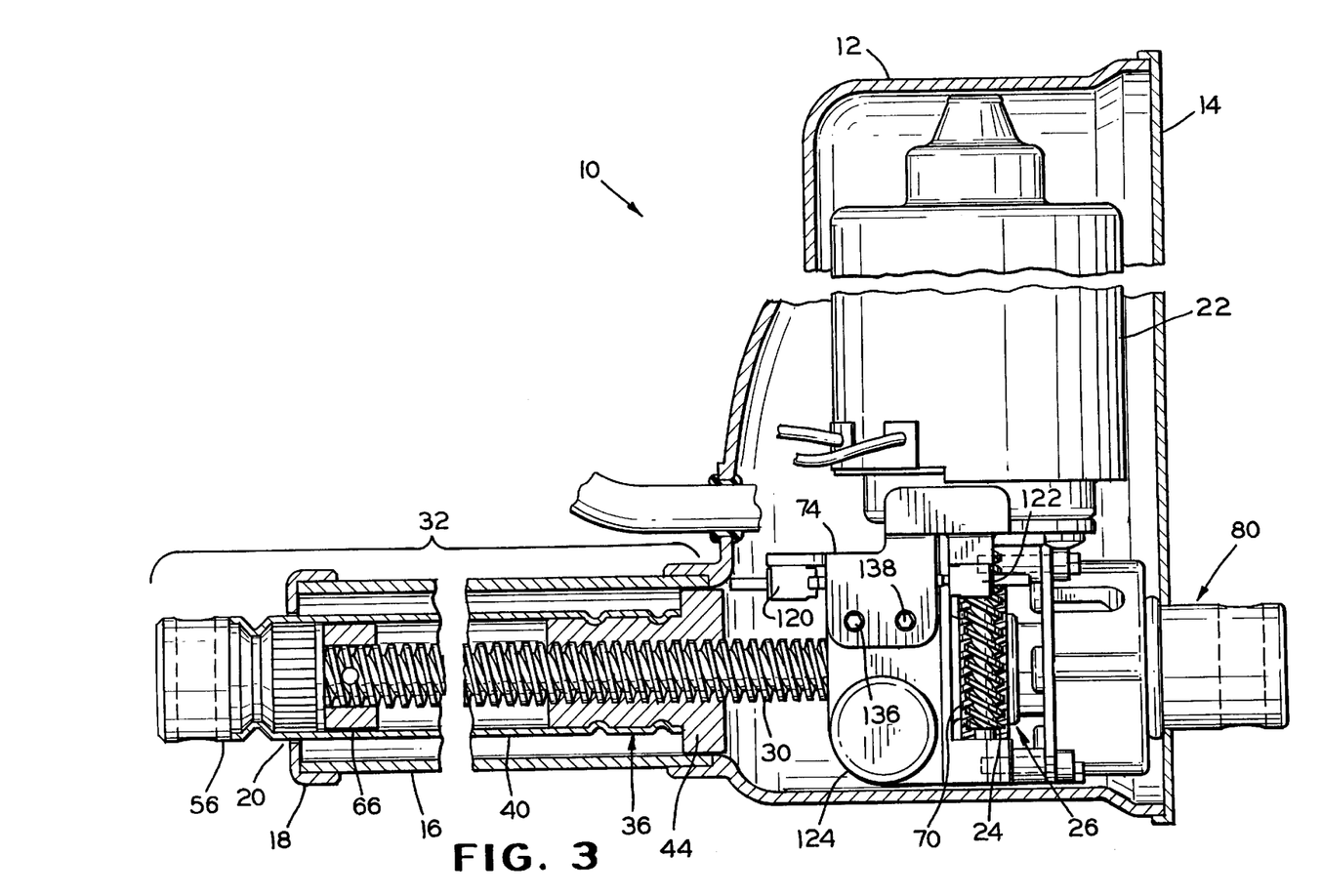
FIG. 3 is a side elevational view similar to FIG. 2.

As shown in FIG. 3, the lead screw 30 is supported within the extension tube 40 by the end stop 66 and the nut 36. In turn, the extension tube assembly 32 and lead screw are supported within the generally square-shaped cover tube 16 by the generally square-shaped nut head 44 and by the cover tube end cap 18. The cover tube end cap has an aperture 20 through which the extension tube 40 is extended and retracted. Located adjacent the aperture 20 are two annular-shaped recesses, not shown, for receiving two O-rings, not shown which wipe against the extension tube, and provide protection against dirt dust and water.

The worm gear drive train 26 is comprised of a worm drive shaft 24 having an axis which is disposed at a 90 degree angle to the axis of a driven worm gear 70 such that the axis of the worm drive shaft 24 and driven worm gear 70 are non-parallel. The worm drive shaft 24 is connected to the motor 22 and meshingly engages the driven worm gear 70 which is fixedly mounted on the lead screw 30. The rotation of the driven worm gear 70 by the worm drive shaft 24 causes the lead screw 30 to be rotated at a desired speed. The speed at which the lead screw is rotated can be varied by changing the gear ratio between the worm drive and the driven worm gear. However, in a preferred embodiment, a single gear ratio is used and the speed at which the lead screw is rotated is varied by using interchangeable lead screws having different pitches.

The lead screw 30 is also supported near the middle of the linear actuator 10 by a mounting bracket 74 which is connected to the outside diameter of the lead screw 30 through a bushing, not shown, and bearing, not shown. The mounting bracket 74 also Supports the motor 22, the worm gear drive shaft 24, and several other elements, as will be explained below. Therefore, the mounting bracket 74 functions to locate the gear center distances of the worm gear 70 and to maintain the necessary gear backlash to each other and between the gears and the lead screw 30.

Figure 4:
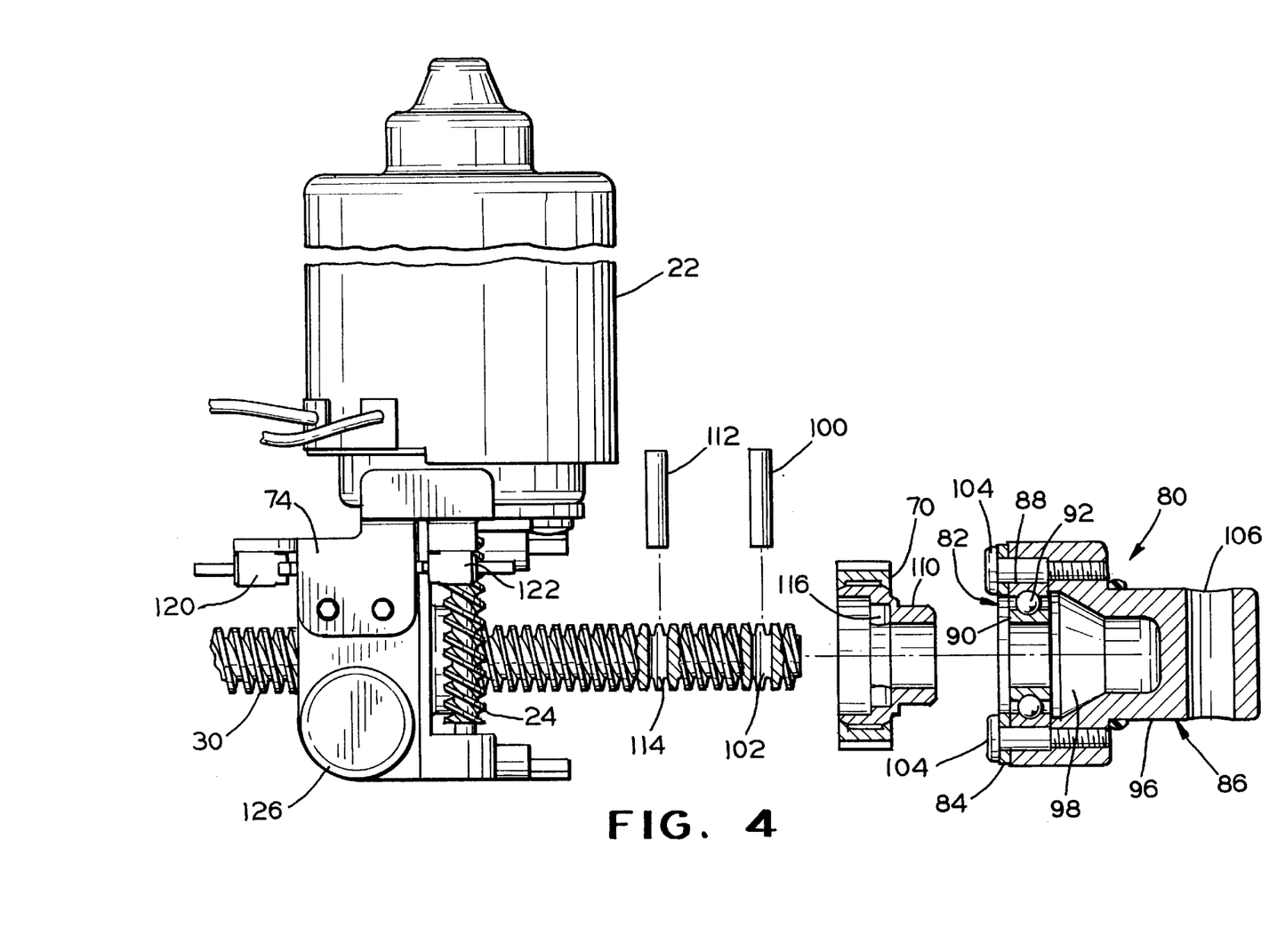
FIG. 4 is an exploded side elevational view of the rear portions of the linear actuator illustrated in FIG. 2.
Figure 5:
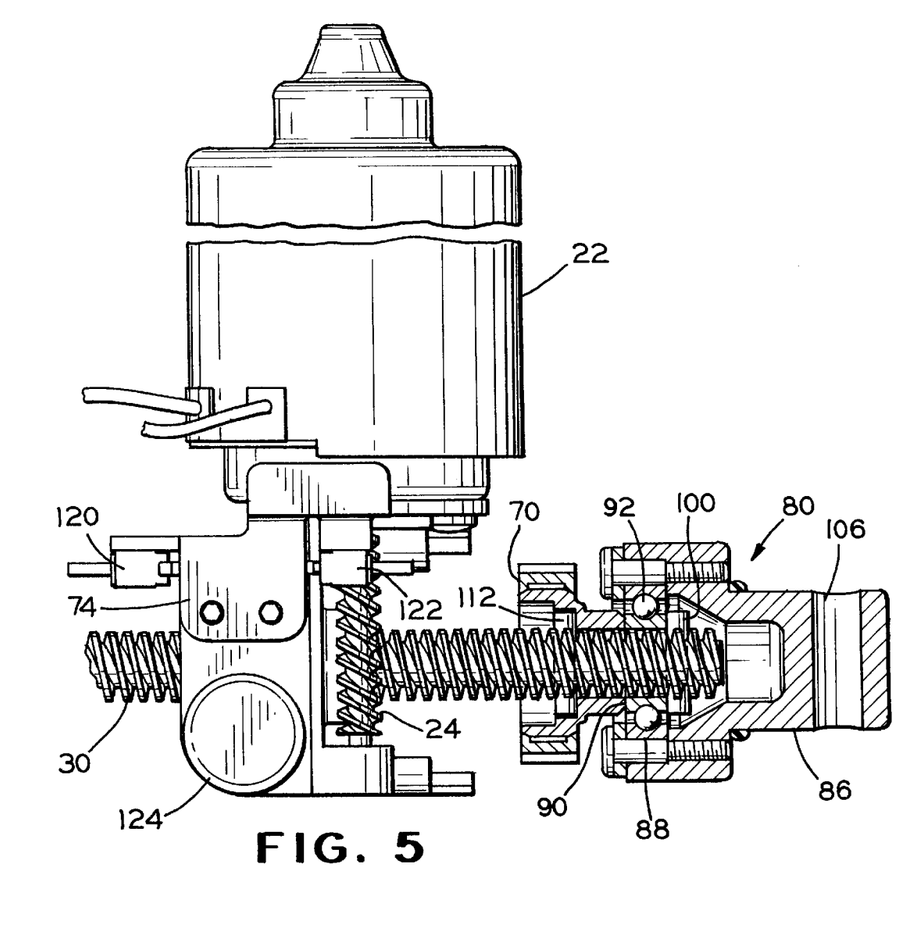
FIG. 5 is a side elevational view similar to FIG. 4 showing the rear portions of the linear actuator partially assembled.

As shown in FIGS. 4 and 5, the lead screw is also supported by the driven worm gear 70 and the rear mounting adapter, indicated generally at 80, both of which are mounted on the lead screw 30. The rear mounting adapter 80 includes a ball bearing unit, indicated generally at 82, a bearing plate 84, and a rear mount, indicated generally at 86. Ball bearing unit 82 includes an outer race 88, an inner race 90, and roller balls 92 which are disposed between the inner race and outer race. Alternatively bronze or plastic bushings could be used in place of the ball bearing 81 to carry the axial and radial loads. The rear mount 86 is used for securing the linear actuator 10 to any suitable support. In general, the rear mount 86 has a cylindrically shaped body 96 with a central cavity 98 in which the ball bearing unit 82 and lead screw 30 are disposed. The ball bearing unit 82 is mounted on the lead screw 30 and is fixed in place by a cross pin 100. Cross pin 100 extends through a bore 102 in the lead screw and abuts one side of the ball bearing unit 82. On the other side of the ball bearing unit is the bearing plate 84. Bearing plate abuts the outer race 88 of the ball bearing unit and is fixed to the body 96 of the rear mount 86 by threaded bolts 104 or other fastening devices. On the rearward end of the rear mount 86 is a mounting bore 106 which extends perpendicularly through the rear mount 86 and can be used for accepting a pin that will attach the linear actuator 10 to the desired support. Any other suitable mounting configuration can be used.

The inner race 90 of the ball bearing unit 82 abuts a hub portion 110 of the driven worm gear 70. Driven worm gear 70 is fixed in position on the lead screw 30 through the use of a cross pin 112 and a bore 114. The cross pin 112 is received in an annular shaped recess 116 of the driven worm gear 70.

In the preferred embodiment of this invention, machined journals are not used to support the lead screw 30. Instead as described above, substantially all axial loads are resolved or transmitted, including end stop rotational load of the lead screw, by the three cross pins 68, 112 and 100 which fix the position of the end stop 66, the driven worm gear 70, and the ball bearing unit 82 respectively, on the lead screw 30. In addition, all axial thrust forces are contained along the center line of the lead screw and resolved at the ball bearing unit 82, rear mount 86 and the front adapter 56. Therefore, no thrust loads, or at most insubstantial thrust loads, are transmitted to the housing 11.

Figure 6:
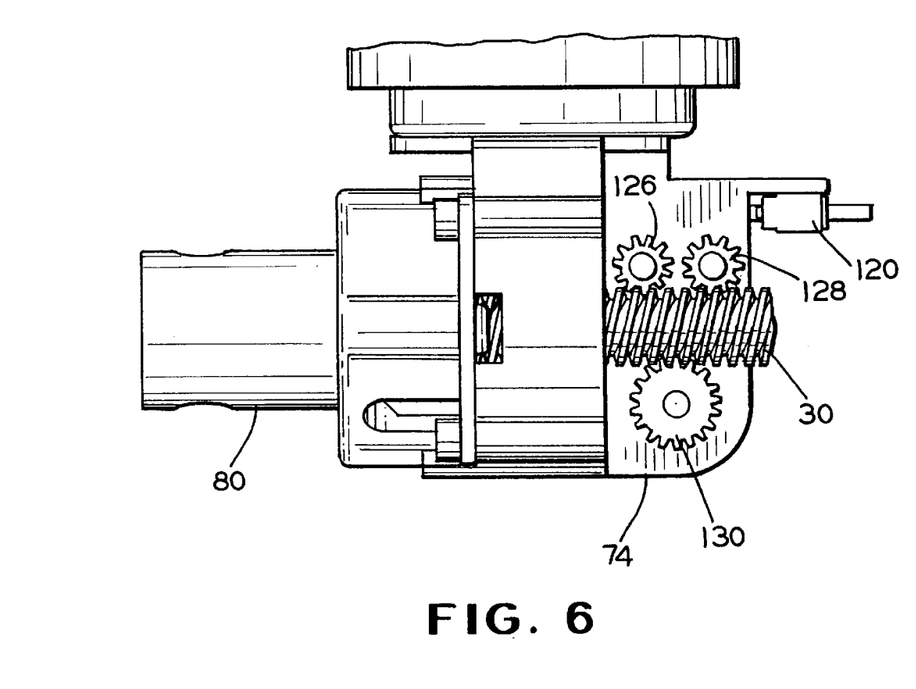
FIG. 6 is a side partial elevational view showing the position sensing potentiometer and limit switches in relation to the lead screw used in the linear actuator assembly.
Figure 7:
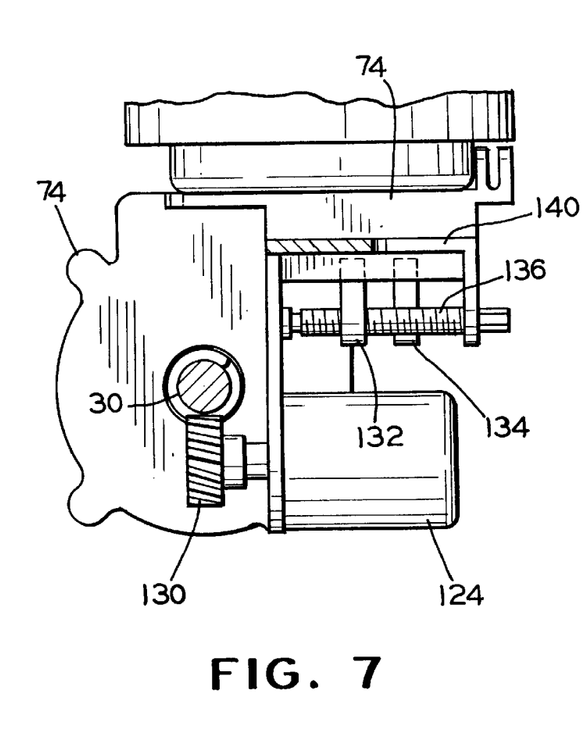
FIG. 7 is a front partial elevational view of the same components shown in FIG. 6.

As shown in FIG. 2, the lead screw 30 is also used to operate two limit switches 120 and 122 and a positional encoder-potentiometer 124 using helical gearing. More specifically, as shown in FIG. 6, helical gears 126 and 128 are driven by the lead screw to operate limit switches 120 and 122, respectively, while helical gear 130 is driven by the lead screw to drive the positional-encoder potentiometer 124. The positional-encoder potentiometer is used to provide feedback control and/or indication with respect to the position of the extension tube assembly 32. The potentiometer operates by a change in resistance corresponding to a change in axial position of the actuator. The limit switches 120 and 122 are used to stop the motor from rotating in its current direction when the number of revolutions of the lead screw corresponds to a predetermined point of travel of the extension tube assembly 32. More specifically, one of the limit switches 120 may be used to stop the motor when the extension tube assembly has been fully extended, as indicated by the front face 46 of the nut 36 abutting the end stop 66. The other limit switch 122 may be used to stop the motor when the extension tube assembly is fully retracted, as indicated by the front stop 54 abutting the end stop 66. Alternatively, these limit switches could be used to stop the motor at any point of travel of the extension tube assembly. For definition purposes only, limit switch 120 will be designated as the extend stop limit switch while limit switch 122 will be designated as the retract stop limit switch. As best seen in FIG. 7, contact cams 132 and 134 having mating threads are mounted on limit switch shafts 136 and 138, respectively. Each contact cam 132 and 134 has a finger-like portion which is captured in a slot 140 found in the support bracket 74. Only one slot 140 is shown in FIG. 7, but another slot is used to capture contact cam 134 such that the contact cams 132 and 134 are prevented from rotating with their respective limit switch shafts 136 and 138. Instead, the contact cams 132 and 134 move axially along the limit switch shafts 136 and 138, respectively, as these shafts turn. As the finger-like portions of the contact cams 132 and 134 slide in their respective slots 140, they will engage either mechanical or electrical contacts which, when actuated, will stop the motor. Instead of slots 140, a restraining pin could be fitted through each cam such that each cam would move axially with its pin, and thereby prevent rotation with respect to the limit switch shafts 136 and 138. By gearing the limit switches 120 and 122 and the positional-encoding potentiometer 124 directly to the lead screw, both the rotational and axial movement of the lead screw is translated to a change in position. This can provide for a more sensitive and accurate positional reading than by mounting positional encoders or limit switches on the motor shaft.

The mounting bracket 74 supports the positional encoder-potentiometer 124 and the two position limit switches 120 and 122. The positional encoder-potentiometer 124 and the position limit switches 120 and 122 are connected through helical gearing to the lead screw. Therefore, the support bracket 74 functions to locate the gear center distances of the worm gear 70, the gearing for the positional encoder-potentiometer 124, and the limit switches 120 and 122 so as to maintain the necessary gear backlash to each other and between the gears and the lead screw 30.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A linear actuator comprising:

a motor having a rotatable output shaft;

a lead screw having a worm gear thread, a forward end and a rear end;

a worm gear drive train connected between said motor output shaft and said lead screw for supporting said lead screw and for converting the rotary motion of said motor output shaft into rotary motion of said lead screw;

an extension tube assembly mounted at the forward end of said lead screw, said extension tube assembly comprising an extension tube concentrically disposed around the forward end of said lead screw and having a forward end and a rear end, said extension tube assembly further comprising a nut connected to the rear end of said extension tube and threadedly mounted on said lead screw so that rotation of said lead screw causes said nut and said extension tube assembly to move in an axial direction along said lead screw;

a front adapter mounted at the forward end of said extension tube assembly for contacting a device requiring linear motion;

an end stop disposed within said extension tube for supporting the forward end of said lead screw; and a mounting adapter positioned at the rear end of said lead screw for rotatably mounting said lead screw and for attaching said linear actuator to a support structure, wherein axial forces exerted on said lead screw are contained along a center line of said lead screw and resolved at said front adapter and said mounting adapter.

2. The linear actuator of claim 1 in which said mounting adapter supports said lead screw for rotation with a mounting device selected from the group consisting of a ball bearing unit, a bronze bushing and a plastic bushing.

3. The linear actuator of claim 2 in which said mounting adapter supports said lead screw with a ball bearing unit, and in which a cross pin fixes the axial position of said ball bearing unit with respect to said lead screw.

4. The linear actuator of claim 1 having a housing mounted on said mounting adapter for covering said linear actuator.

5. The linear actuator of claim 4 wherein said housing is made from a plastic material.

6. The linear actuator of claim 5 wherein said plastic material is nylon.

7. The linear actuator of claim 1 including a mounting bracket depending from said mounting adapter, where said motor and said worm gear drive train are mounted on said mounting bracket.

8. The linear actuator of claim 1 in which said nut has a generally square shaped nut head and said housing includes a cover tube having a corresponding generally square cross-sectional shape to prevent said nut from rotating with said lead screw but allowing said nut to move axially along said lead screw.

9. The linear actuator of claim 1 including a front stop mounted at the forward end of said extension tube, wherein said front stop abuts said end stop when said extension tube assembly is moved to a fully retracted position.

10. The linear actuator of claim 9 wherein said front stop and said end stop are made from a material having a low coefficient of friction.

11. The linear actuator of claim 1 including an end stop positioned on the forward end of said lead screw, within said extension tube, and further including a front face on said nut, wherein said front face abuts said end stop when said extension tube assembly is moved to a fully extended position.

12. The linear actuator of claim 11 wherein said front face of said nut and said end stop are made from a material having a low coefficient of friction.

13. The linear actuator of claim 1 including a feedback and control device for providing feedback and control relating to the axial position of said extension tube assembly, said feedback and control device being operatively connected to said lead screw through gearing which is driven by said lead screw.

14. The linear actuator of claim 13 wherein said feedback and control device is comprised of two limit switches which are driven by helical gearing which meshingly engages said lead screw.

15. The linear actuator of claim 13 wherein said feedback and control means is comprised of a positional-encoding potentiometer which is driven by a helical gear which meshingly engages said lead screw.

16. A linear actuator comprising:

a motor having a rotatable output shaft;

a lead screw having a worm gear thread, a forward end and a rear end;

a worm gear drive train connected between said motor output shaft and said lead screw for supporting said lead screw and for converting the rotary motion of said motor output shaft into rotary motion of said lead screw;

an extension tube assembly mounted at the forward end of said lead screw, said extension tube assembly comprising an extension tube concentrically disposed around the forward end of said lead screw and having a forward end and a rear end, said extension tube assembly further comprising a nut connected to the rear end of said extension tube and threadedly mounted on said lead screw so that rotation of said lead screw causes said nut and said extension tube assembly to move in an axial direction along said lead screw;

a front adapter mounted at the forward end of said extension tube assembly for contacting a device requiring linear motion;

an end stop disposed within said extension tube assembly for supporting the forward end of said lead screw;

a mounting adapter positioned at the rear end of said lead screw for rotatably mounting said lead screw and for attaching said linear actuator to a support structure, said mounting adapter supporting said lead screw for rotation with a mounting device selected from the group consisting of a ball bearing unit, a bronze bushing and a plastic bushing; and a housing to cover said linear actuator, said housing being mounted on said mounting adapter, wherein substantially all of the axial forces along said lead screw are transmitted through said mounting adapter and said front adapter and not through said housing.

17. The linear actuator of claim 16 in which said nut has a generally square shaped nut head and said housing includes a cover tube having a corresponding generally square cross-sectional shape to prevent said nut from rotating with said lead screw but allowing said nut to move axially along said lead screw, and further including a front stop mounted at the forward end of said extension tube, wherein said front stop abuts said end stop when said extension tube assembly is moved to a fully retracted position, and further including a front face on said nut, wherein said front face abuts said end stop when said extension tube assembly is moved to a fully extended position.

18. The linear actuator of claim 16 including a mounting bracket depending from said mounting adapter, where said motor and said worm gear drive train are mounted on said mounting bracket.

19. The linear actuator of claim 16 including a feedback and control device for providing feedback and control relating to the axial position of said extension tube assembly, said feedback and control device being operatively connected to said lead screw through gearing which is driven by said lead screw, wherein said feedback and control device includes two limit switches which are driven by helical gearing which meshingly engages said lead screw, and wherein said feedback and control means includes a positional-encoding potentiometer which is driven by a helical gear which meshingly engages said lead screw.

20. A linear actuator comprising:
   a motor having a rotatable output shaft;
   a lead screw having a worm gear thread, a forward end and a rear end;
   a worm gear drive train connected between said motor output shaft and said lead screw for supporting said lead screw and for converting the rotary motion of said motor output shaft into rotary motion of said lead screw; an extension tube assembly mounted at the forward end of said lead screw, said extension tube assembly comprising an extension tube concentrically disposed around the forward end of said lead screw, said extension tube having a forward end for contacting a device requiring linear motion and a rear end, said extension tube assembly further including a nut connected to the rear end of said extension tube and threadedly mounted on said lead screw so that rotation of said lead screw causes said nut and said extension tube assembly to move in an axial direction along said lead screw;
   a front adapter mounted at the forward end of said extension tube assembly for contacting a device requiring linear motion;
   an end stop disposed within said extension tube for supporting the forward end of said lead screw;
   a mounting adapter positioned at the rear end of said lead screw for rotatably mounting said lead screw and for attaching said linear actuator to a support structure;
   a mounting bracket depending from said mounting adapter, said motor and said worm gear drive train being mounted on said mounting bracket; and
   a feedback and control device for providing feedback and control relating to the axial position of said extension tube assembly, said feedback and control device being mounted on said bracket and being operatively connected to said lead screw through gearing which is driven by said lead screw,
   wherein axial forces exerted on said lead screw are contained along a center line of said lead screw and resolved at said front adapter and said rear mounting adapter.

* * * * *